UNITED STATES PATENT OFFICE.

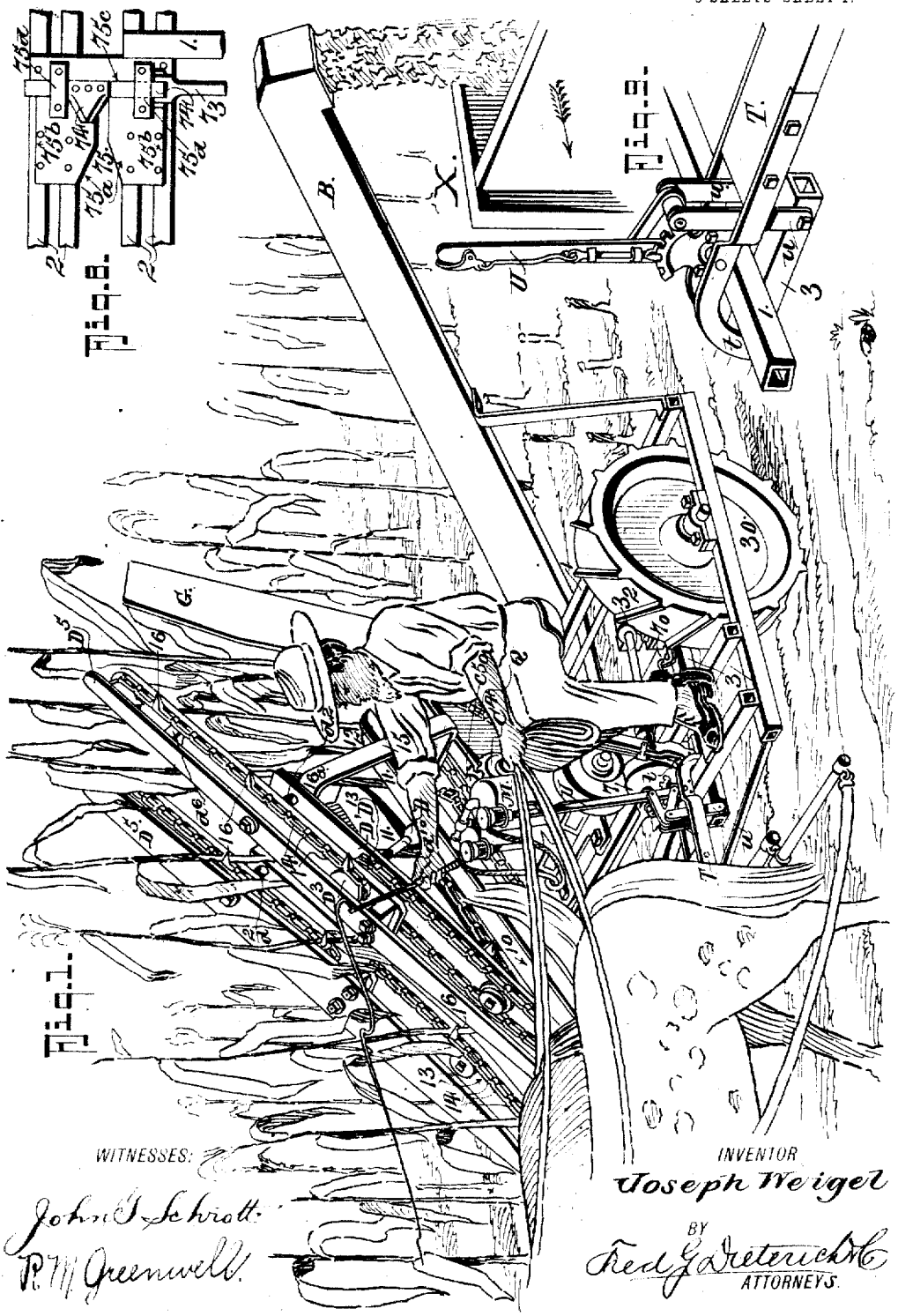

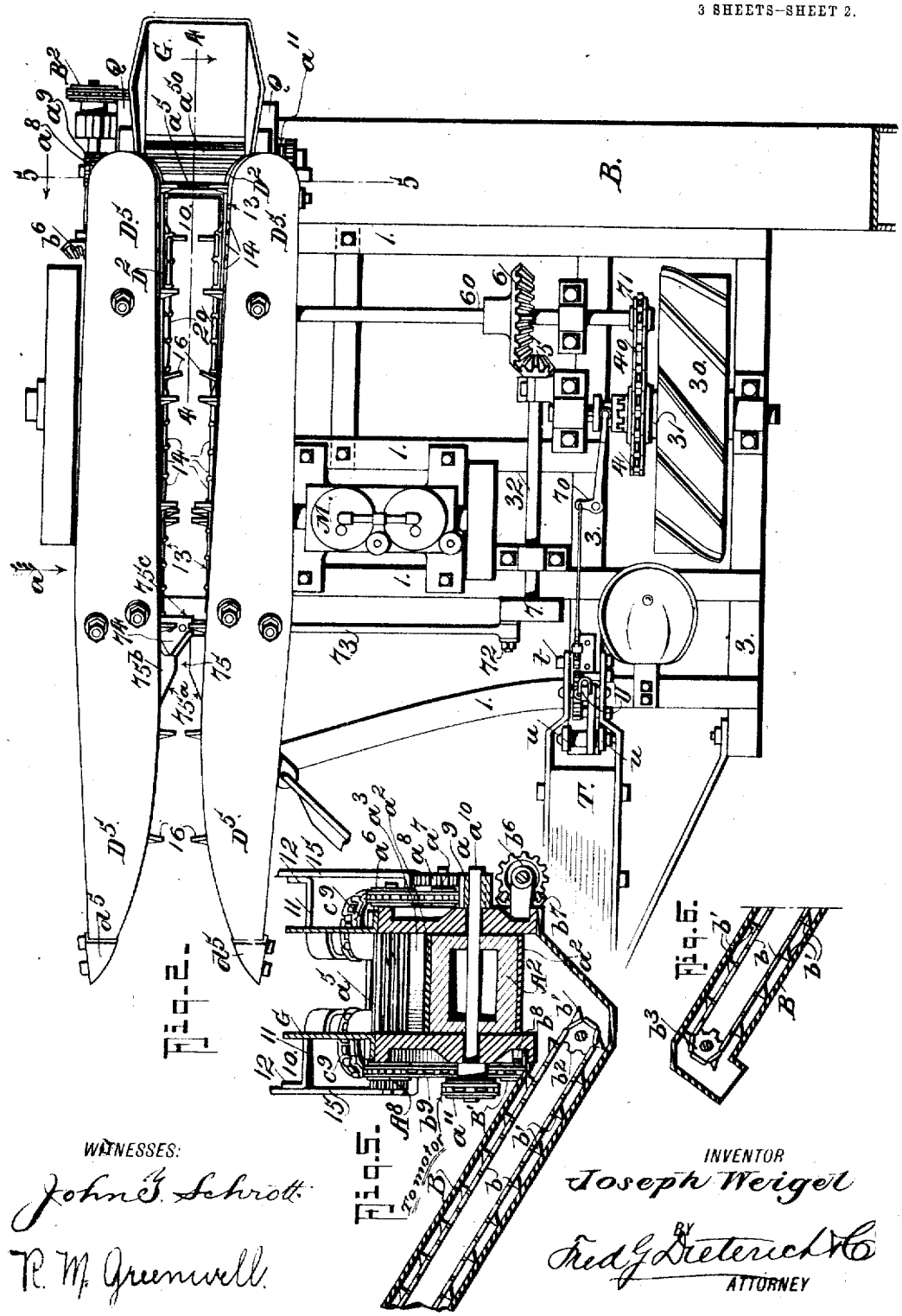

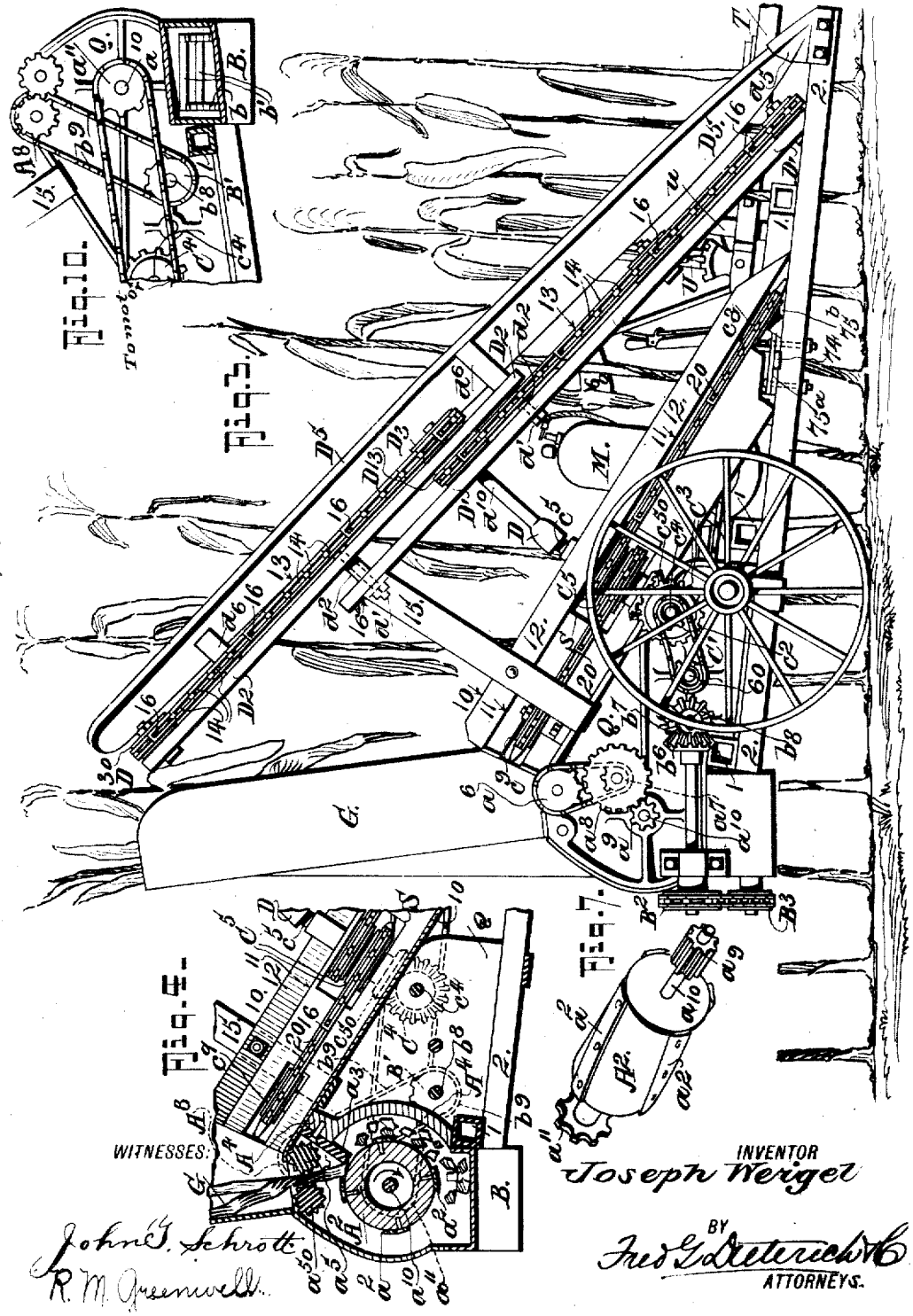

JOSEPH WEIGEL, OF FLANDREAU, SOUTH DAKOTA.

ENSILAGE-HARVESTER.

1,021,855.

Specification of Letters Patent.

Patented Apr. 2, 1912.

Application filed May 20, 1911. Serial No. 628,392.

*To all whom it may concern:*

Be it known that I, JOSEPH WEIGEL, a citizen of the United States, and resident of Flandreau, in the county of Moody and State of South Dakota, have invented a new and Improved Ensilage-Harvester, of which the following is a specification.

My invention, which in general nature relates to machines for harvesting corn and the like, is more especially designed for harvesting corn for ensilage purposes, and it has for its object to provide a machine of the general character stated of a simple, economical and stable construction, in which the several parts are compactly and cooperatively so arranged whereby the operation of cutting down the corn stalks while standing, delivering the cut stalks to cutting means for reducing them to ensilage and for conveying the ensilage to a silo or desired collecting place, can be quickly, positively and economically accomplished.

My invention comprehends combined corn stalk harvesting, feeding, cutting and discharging mechanisms that are hereinafter fully explained, specifically pointed out in the claims and illustrated in the accompanying drawings, in which:—

Figure 1, is a perspective view of my invention. Fig. 2, is a general plan view of my complete machine. Fig. 3, is an elevation of that side of the machine indicated by the arrow a, on Fig. 2. Fig. 4, is a partial section on the line 4—4 on Fig. 2. Fig. 5, is a cross section of the same on the line 5—5 on Fig. 2, looking in the direction of the arrow. Fig. 6, is a detail section of the upper end of the conveyer. Fig. 7, is a detail perspective view of the cutting cylinder. Fig. 8, is a detail plan view of the cutting mechanism. Fig. 9, is an enlarged detail perspective view showing the tongue connection and the frame adjusting lever. Fig. 10, is a detail side elevation, hereinafter referred to.

In the practical development of my invention, the main frame has a series of cross beams 1 connected at one end to a pair of longitudinal parallel beams 3—3, the other ends of the said beams 1—1 being secured on the inner one of the gathering members 2, the latter being preferably formed of angle iron and the former of hollow square metal tubing.

30 designates the driver or "bull" wheel mounted between the parallel beams 3—3 and on the inner face of the wheel the hub 31 thereof carries a chain wheel 4 from which motion is conveyed to the operating parts, hereinafter described.

32 designates a counter shaft journaled in bearings on the cross beams 1, the forward end of which carries a crank disk 7, and the rear end a bevel pinion 5 that meshes with a larger pinion 6, on a shaft 60 that extends transversely of the machine, and which transmits motion to the ensilage gathering mechanism, hereinafter fully described.

Shaft 60 at the end next the wheel 30, has a chain wheel 71, over which takes the drive chain 40 that passes from the main chain wheel 4, before referred to.

72 designates a wrist pin on the disk 7 to which connects the inner end of a pitman rod 73 that joins with the movable one 74 75 of the sickle cutters, the stationary one 75 of which includes the oppositely disposed throat shearing members 75ᵃ and the lateral bearing portions 75ᵇ which are bolted, or otherwise made fast to the angle beams 2, it being understood that the corn stalks, when the machine travels forwardly, have their lower ends guided into the throatway formed by the members 75ᵃ, and for guiding the movable cutter 74 the members 75 have guide slots 75ᶜ and bridge portions 75ᵈ, as is clearly shown in Fig. 8, such arrangement of parts providing for a free and easy movement of the movable cutter 74 with respect to its mate.

The ensilage cutting mechanism presently referred to is located in the longitudinal plane of and to the rear of the gathering and cutting devices, and for conveying the cut stalks in an upright position, so the lower ends thereof are fed to the means that reduces the stalks to fine particles, or ensilage, I provide the mechanism best shown in Figs. 2, 3 and 4, by reference to which it will be observed a sheet metal chute 10, U 10[0] shaped in cross section extends at an upward incline from the sickle or cutter devices to a point directly over the receiving devices, presently again referred to, that direct the lower or butt ends of the stalks 10 to the cutting means at that end of the machine.

The lower end of the chute 10 is bolted to the top of the gathering angle iron arms, and the upper end is bolted to iron stand- 11 ards 15 that are fastened to the castings Q—Q, presently again referred to, and extend upwardly at opposite sides of the chute, the latter having horizontal side flanges 11—11 and upturned flanges 12—12, the latter being secured to the standards 15, the upper ends of which are turned in at right angles to form bearings 16ª for the oppositely disposed side frames that support the upper endless conveyer devices.

The conveyer devices at the opposite sides of the chute are constructed and operate alike and a detailed description of one set only of such devices is given.

$D'$—$D^2$ designate two timbers of suitable width, and preferably one inch lumber, one of which $D'$ is secured to the inner gathering arm near the outer end thereof and its upper end is bolted to the bearing 16ª of the inner standard 15. Member $D^2$ extends over the upper end of the member $D'$ and is secured thereto by the bolts $d'$ and is held spaced apart therefrom by the thimbles $d^2$.

$D^5$ is a shield board that extends the full length of the two members $D'$—$D^2$ and its lower end fits in an iron socket $d^5$ bolted to the top of the outer end of the gathering arm. The shield board $D^5$ inclines inwardly and is secured on the wedge blocks $d^6$.

D designates a cast knuckle with a square socket for receiving the squared end $c^5$ of a stub shaft projected from a double chain wheel $C^5$ fastened to or formed integral with a pinion $c^{50}$ that meshes with a bevel gear $C^4$ on a cross shaft $c^4$ mounted in the forward end of the side frames Q—Q and whose outer end carries a bevel gear $C^3$ for operating the knuckle connection for the outer one of the conveyer devices, and a chain wheel $c^2$ that receives motion from a chain that takes over the wheel $C'$ on the outer end of the driving shaft 60.

The upper end of the knuckle shaft $d^{10}$ carries a chain wheel $D^3$ located above the board $D^5$ around which takes an endless conveyer chain 13 that also takes around an idler chain wheel $D^{30}$ mounted on the extreme upper end of the board $D^2$. Shaft $d^{10}$ also carries a chain wheel $D^{12}$ located under the board $D^2$ over which takes an endless conveyer chain 13, that also passes over the idler chain wheel at the bottom of the board $D'$ and a chain guide wheel at the inwardly curved edges of the board $D'$—as shown.

The several conveyer chains have certain ones of the links 14 formed with pusher fingers 16 that project inwardly as the chains move upwardly and push the upper ends of the cut stalks upwardly and rearwardly.

20 designates conveyer chains that are made like the other chains that engage the butt or cut ends of the stalks, and they pass over the double chain wheel $C^5$, the inner edge of which rides through a horizontal slot S in the vertical wall of the chute, and over a chain wheel $c^8$ at the lower end, and a similar wheel $c^9$ at the upper end of the chute.

By reason of the peculiar construction and arrangement of the parts shown and described, it will be apparent that when the machine is drawn forwardly the stalks are gathered, severed at the butt end and conveyed in a standing position to the supplemental cutting mechanism that reduces the gathered stalks to finely cut particles, and for holding the stalks in proper position for being drawn down into engagement with the said supplemental cutting mechanism, a trough-like pocket or shield G is fastened to the rear upper edges of the side frames Q—Q, as is clearly shown in Fig. 3, which also shows the general arrangement of the supplemental cutting mechanism, now to be explained.

The side castings Q—Q are of suitable thickness with the edges of the bearings therein flanged to add strength thereto.

$A^2$ designates a rotary cylinder provided with a number, preferably four, spirally arranged peripheral knives $a^2$ that coact with a ledger plate $a^3$ mounted on a heavy cast curved shield $A^4$ that also forms a front guiding wall for directing the cut particles down into a conveyer and elevator B that carries the ensilage to one side and discharges the same into a wagon X drawn alongside of the machine, the same being brokenly indicated in Fig. 1.

The conveyer B includes the endless chain $b$ provided with buckets $b'$ that passes over the chain roller $b^2$ at the lower end of the conveyer and over an idler chain roller $b^3$ in the upper or discharging end.

The conveyer and elevator is mounted and braced to the main frame in any well known manner, and its belt is drawn by the chain wheel $B^2$ on the lower roller shaft, over which takes an endless chain that takes over a chain wheel $B^2$ on a shaft that carries a bevel gear $b^4$ held in mesh with a bevel gear $b^5$ on a shaft $b^6$ that is mounted transversely of the side frames Q—Q and which carries a sprocket wheel $B'$ see Fig. 10, receiving motion through a chain $b^6$ from a sprocket $A^5$ on a fluted roller $a^5$ the stub shaft of which at the other side carries another sprocket $a^6$ which is driven from a hub-like sprocket $a^7$ on a large gear $a^8$ meshing with a pinion $a^6$ on the cutting cylinder shaft $a^{10}$. At the other end, shaft $a^{10}$ carries a sprocket $a^{11}$ which is driven from a motor M of any suitable type. Fluted roller $a^5$ has at one side a gear which meshes with a similar one on a second fluted roller $a^{50}$, thus giving it motion in an opposite direction.

T designates the tongue which is pivotally connected to the framing, as at $t$.

U is a lever which represents a means by which the machine is raised and lowered from and toward the ground, and this object is further accomplished by means of the strap irons $u$ which, when the lever is adjusted, either backwardly or forwardly, force the frame up or down, this operation being readily apparent by reference to Fig. 9 of the drawings.

In the practical handling of the machine, clutch mechanism 70 of any approved type may be combined with the driving mechanism actuated by the main or "bull" wheel, and may be worked from the driver's seat to throw the machine in and out of action.

In the use of my machine as it is driven along the stalks are cut by the cutting mechanism 74 and 75 and regularly fed to the cutting cylinder which being rapidly rotated from the motor M, will easily dispose of the stalks as they are fed up and all choking of the machine is avoided. When one wagon is loaded it may be driven off to the silo and another wagon drawn in place to receive the next load of cuttings, the operation of the parts being practically automatic, with little or no interruption and without manual handling of the cut stalks.

What I claim is:

1. A harvesting machine comprising the following elements in combination; a first cutting mechanism for cutting the standing stalks, means for carrying the cut stalks parallel to their initial position, a second cutting mechanism, and means for directing the cut stalks with their butt ends first into direct engagement with the said second cutting mechanism.

2. A harvesting machine comprising the following elements in combination; a first cutting mechanism for cutting the standing stalks, means for carrying the cut stalks parallel to their initial position, a second cutting mechanism, means for feeding the cut stalks with their butt ends first into direct engagement with the second cutting mechanism, and means for collecting the cut stalks from the carrying means and holding them with their butt ends perpendicular to the said second cutting mechanism.

3. A harvesting machine comprising in combination with gathering devices and a cutting mechanism for severing the stalks that coöperates with the gathering devices, of a chopping mechanism for reducing the gathered stalks into small particles, means for collecting and conveying the cut stalks from the cutting mechanism to the chopping mechanism, said conveying means including devices for sustaining the cut stalks in the vertical position and delivering them perpendicularly to the chopping mechanism and a chute for engaging the butt ends of the cut stalks for directing the said ends to the said second cutting mechanism.

4. In a harvesting machine, the combination with gathering means and stalk cutting devices that coöperate therewith, of chopping mechanism, said chopping mechanism including feed devices for forcing the stalks endwise to the chopping devices, and other means for gathering and conveying the cut stalks, and delivering them in their vertical position to the aforesaid feed devices said other means including a U-shaped chute upon which the butt ends of the stalks ride and which extends from the cutting mechanism to the chopping mechanism.

5. In a harvesting machine, the combination with stalk gathering and cutting mechanism, and means for conveying the cut stalks in an upright position away from the cutting mechanism and other means for pocketing the cut stalks; of a chopping mechanism under the stalk pocketing means, a delivery means including gripping devices for pulling the stalks endwise down to the chopping mechanism and a runway for the stalk butts that extends from the cutting to the chopping mechanism.

6. In a harvesting machine, the combination with stalk gathering and cutting mechanism, and means for conveying the cut stalks in an upright position away from the cutting mechanism and for pocketing the cut stalks; of a chopping mechanism under the stalk pocketing position, a delivery means including gripping devices for pulling the stalks endwise down to the chopping mechanism, said chopping mechanism consisting of a rotary cylinder having peripheral cutters, and a ledger plate.

7. In a harvesting machine, the combination with stalk gathering mechanism, and means for conveying the cut stalks in an upright position away from the cutting mechanism and for pocketing the cut stalks; of a chopping mechanism under the stalk pocketing position, a delivery means including gripping devices for pulling the stalks endwise down to a chopping mechanism, said chopping mechanism consisting of a rotary cylinder having peripheral cutters, a ledger plate, and a front guard for directing the discharge of the choppings and means for collecting the cuttings and discharging to one side of the machine.

8. In a harvester machine, a primary cutting mechanism, a conveying mechanism for gripping the cut stalk and moving it bodily upwardly and rearwardly into the machine while maintaining the cut stalk parallel to its initial position, an ensilage cutting mechanism, a trough into which the cut stalk is delivered by said conveying mechanism, said trough being held substantially vertical to deliver the cut stalk butt end first downwardly into the ensilage cutting mechanism, and means for delivering the finely cut stalk portions from the machine together with mechanism for operating both of said cutting mechanisms and said conveying mechanism.

9. In a harvesting machine, an upper and lower gathering and conveying mechanism for feeding the stalks upwardly and rearwardly into the machine and moving them in positions parallel to their initial position, said upper gathering mechanism projecting in advance of said lower gathering mechanism, a primary cutting mechanism at the entrant end of said lower gathering mechanism, an ensilage cutting mechanism at the rear of said lower gathering mechanism, a trough extending from said ensilage cutting mechanism substantially vertically upward to the end of said upper gathering mechanism to receive the stalks and deliver them vertically downward, butt end first, to said ensilage cutting mechanism, and power applying devices for operating both of said cutting mechanisms and both of said gathering mechanisms.

10. In a harvesting machine, the combination with means for gathering the standing stalks and feeding them upwardly and rearwardly into the machine, of a primary cutting mechanism coöperative with said gathering means for cutting the standing stalks from the stubs, a stalk chopping mechanism, means for receiving the stalks from the gathering and conveying mechanism, in an upright position and delivering them vertically downward butt end first into the chopping mechanism, and means for receiving the chopped stalk portions and delivering them from the machine together with a power applying mechanism for operating said gathering mechanism, said cutting mechanism and said chopping mechanism.

11. In a harvesting machine, the combination with stalk gathering mechanism including an upper and a lower set of endless conveyer chains having pusher members, of a stalk severing mechanism at the entrance to said lower chains, a stalk chopping mechanism at the delivery end of said lower chains, and a trough-like receiver at the delivery ends of said upper and lower chains for receiving the cut stalks in an upright position and delivering them downwardly, end first, to said chopping mechanism, and means for receiving the chopped stalk portions from said chopping mechanisms and delivering the same out of the machine.

JOSEPH WEIGEL.

Witnesses:
J. R. Cooms,
J. A. Smith.